United States Patent
Ayandeh

(10) Patent No.: US 9,893,989 B2
(45) Date of Patent: Feb. 13, 2018

(54) HARD ZONING CORRESPONDING TO FLOW

(71) Applicant: HEWLETT PACKARD ENTERPRISE DEVELOPMENT LP, Houston, TX (US)

(72) Inventor: Siamack Ayandeh, Littleton, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 73 days.

(21) Appl. No.: 14/888,282

(22) PCT Filed: Jun. 24, 2013

(86) PCT No.: PCT/US2013/047351
§ 371 (c)(1),
(2) Date: Oct. 30, 2015

(87) PCT Pub. No.: WO2014/209265
PCT Pub. Date: Dec. 31, 2014

(65) Prior Publication Data
US 2016/0065462 A1    Mar. 3, 2016

(51) Int. Cl.
*H04L 12/28* (2006.01)
*H04L 12/721* (2013.01)
*H04L 29/06* (2006.01)
*H04L 12/24* (2006.01)
*H04L 12/781* (2013.01)
(Continued)

(52) U.S. Cl.
CPC .......... *H04L 45/66* (2013.01); *H04L 41/0803* (2013.01); *H04L 41/12* (2013.01); *H04L 45/52* (2013.01); *H04L 45/74* (2013.01); *H04L 47/2441* (2013.01); *H04L 63/0236* (2013.01)

(58) Field of Classification Search
CPC ..... H04L 45/66; H04L 41/0803; H04L 41/12; H04L 47/2441; H04L 45/74; H04L 45/52; H04L 63/0236
See application file for complete search history.

(56) References Cited

U.S. PATENT DOCUMENTS 6,798,751 B1 * 9/2004 Voit .................... H04L 47/2408
370/252
7,430,203 B2    9/2008 Millet et al.
(Continued)

FOREIGN PATENT DOCUMENTS

KR    10-2003-0036216 A    5/2003

OTHER PUBLICATIONS

International Search Report and Written Opinion, International Application No. PCT/US2013/047351, dated Mar. 18, 2014, pp. 1-10.
(Continued)

*Primary Examiner* — Clemence Han
(74) *Attorney, Agent, or Firm* — Hewlett Packard Enterprise Patent Department

(57) ABSTRACT

A network controller may include a flow identifier to identify a flow using frame information. The frame information may be transmitted by a network switch. The network controller may include a retriever to retrieve hard zoning configuration data corresponding to the flow. The hard zoning configuration data may be used by the network switch to update an access control list.

19 Claims, 3 Drawing Sheets

(51) Int. Cl.
*H04L 12/741* (2013.01)
*H04L 12/851* (2013.01)

(56) References Cited

U.S. PATENT DOCUMENTS

| | | | |
|---|---|---|---|
| 7,533,169 B1* | 5/2009 | Gold | G06F 11/0751 |
| | | | 709/223 |
| 8,072,987 B1 | 12/2011 | Madnani et al. | |
| 8,274,993 B2 | 9/2012 | Sharma et al. | |
| 8,364,852 B1 | 1/2013 | Shukla et al. | |
| 9,455,906 B2 | 9/2016 | Ayandeh | |
| 2002/0110125 A1* | 8/2002 | Banks | H04L 29/12056 |
| | | | 370/392 |
| 2006/0133376 A1* | 6/2006 | Valdevit | H04L 41/024 |
| | | | 370/390 |
| 2007/0067589 A1* | 3/2007 | Mishra | H04L 67/125 |
| | | | 711/163 |
| 2009/0037977 A1* | 2/2009 | Gai | H04L 41/00 |
| | | | 726/1 |
| 2011/0022693 A1* | 1/2011 | Cheethirala | H04L 49/357 |
| | | | 709/222 |
| 2011/0228670 A1* | 9/2011 | Sasso | H04L 41/0668 |
| | | | 370/221 |
| 2012/0039163 A1 | 2/2012 | Nakajima | |
| 2012/0201140 A1 | 8/2012 | Suzuki et al. | |
| 2012/0226801 A1 | 9/2012 | Velaga et al. | |
| 2012/0254554 A1* | 10/2012 | Nakajima | G06F 3/0607 |
| | | | 711/154 |
| 2012/0314605 A1 | 12/2012 | Akiyoshi | |
| 2012/0320799 A1 | 12/2012 | Banks et al. | |
| 2013/0297866 A1* | 11/2013 | Varghese | H04L 67/1097 |
| | | | 711/108 |
| 2014/0029467 A1* | 1/2014 | Natrajan | G06F 13/4022 |
| | | | 370/254 |
| 2014/0269290 A1* | 9/2014 | Cors | H04L 47/80 |
| | | | 370/232 |
| 2015/0085867 A1* | 3/2015 | Desanti | H04L 45/44 |
| | | | 370/392 |

OTHER PUBLICATIONS

Phillip Porras et al., "A Security Enforcement Kernel for OpenFlow Networks," HotSDN'12, Aug. 13, 2012, Helsinki, Finland, pp. 1-6, ACM.

* cited by examiner

HARD ZONING CORRESPONDING TO FLOW

BACKGROUND

Computer networks may include multiple nodes, which may include network devices such as routers, switches, hubs, and computing devices such as servers, personal computers (PCs), laptops, workstations, mobile devices, storage devices, and peripheral devices. Such computer networks may be connected using wireless or wired links in local or wide area networks (LANs or WANs). Various networking protocols may be used to implement LANs or WANs.

A storage area network (SAN) is a network that provides access to consolidated, block level data storage. Various transport protocols may be used in implementing a SAN. Transport protocols offering high bandwidth and low latency, such as connection-based protocols, including Fibre Channel (FC) and Fibre Channel over Ethernet (FCoE); and session-based protocols, such as Remote Direct Memory Access over Converged Ethernet (RoCE) and Internet Small Computer System Interface (iSCSI), may be used in some SANs. Several transport technologies may exist independently or as separate traffic classes within the same network.

BRIEF DESCRIPTION OF THE DRAWINGS

Certain examples are described in the following detailed description and in reference to the drawings, in which.

DETAILED DESCRIPTION OF SPECIFIC EXAMPLES

Switched fabric network topologies (fabrics) may be used as transport infrastructures in LANs or WANs, and SANs. In a fabric, devices are interconnected via intermediate network switch. Each device, or node, connects to a switch, called an "edge switch," of the fabric. Accordingly, when a first device sends a frame to a second device, the first device transmits the frame via the switch to which it is directly connected, termed the "ingress switch." The frame is sent through the fabric to the switch to which the second device is directly connected, termed the "egress switch." The frame is sent by the egress switch to the second device.

Hardware enforced closed user groups (CUGs) may be created in fabrics using hard zoning. In hard zoning, connectivity and visibility is limited to devices in the same CUG. A device in a hard zoned CUG can only see and communicate with devices in the same CUG. In contrast, in soft zoning, visibility, but not connectivity, is limited to devices in the same CUG. A device in a soft zoned CUG can communicate with a device outside the CUG if it knows the address of the device outside the CUG.

Some transport protocols used in SANs or other datacenter applications, such as RoCE, lack zoning schemes. Other transport protocols, such as iSCSI, only have soft zoning schemes. Although some transport protocols, such as FC and FCoE, provide hard zoning schemes, the schemes may be specific to the transport protocol and may require dedicated hardware resources at the edge switches.

Some implementations of the disclosed technology may be used to provide hard zoning to fabrics in a transport independent manner. For example, a network controller may be used to instantiate hard zoning in a transport independent manner in a controlled fabric. This may allow hard zoning to be applied to various transport protocols that otherwise lack hard zoning capability.

Additionally, a common hard zoning scheme may be applied to various different transport protocols. This may allow the same hardware resources, such as ternary content addressable memory (TCAM) tables, to be used to implement common hard zoning techniques across different transport technologies. For example, the same hardware resources may be used by a switch to implement a CUG for devices using RoCE and to implement a CUG for devices using FCoE. Additionally, this may avoid a requirement for specific transport protocols to include hard zoning schemes, which may decrease the complexity of the protocols and simplify protocol stack implementations.

Further, aspects of the disclosed technology may remove the need for login and logout procedures to implement hard zoning. This may reduce network overhead and simplify network administration.

Figure 1:
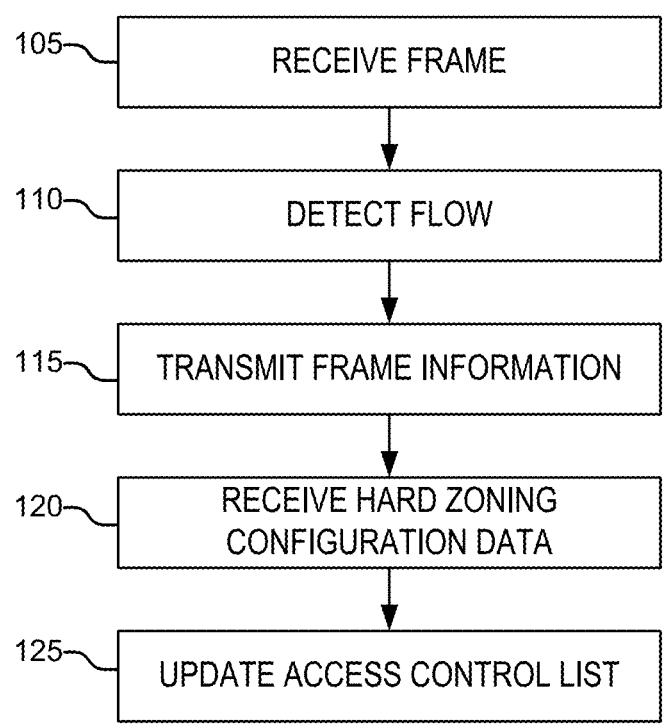
FIG. 1 illustrates an example method of network switch operation for updating an access control list according to hard zoning configuration data provided by a network controller.

FIG. 1 illustrates an example method of network switch operation for updating an access control list according to hard zoning configuration data provided by a network controller. The illustrated process may be performed to implement a CUG on a switch fabric in a transport independent manner.

The process includes receiving a frame 105. The frame may be any digital data transmission unit transmitted in accordance with any of various transport protocols. For example, the frame may comprise an Ethernet frame used to transmit iSCSI, FCoE, or RoCE packets. As another example, the frame may comprise a FC frame.

The process further includes detecting a flow corresponding to the frame 110. The term "flow" refers to a sequence of frames used for communication between two network nodes. For example, a flow may comprise a connection in compliance with an FC protocol or an FCoE protocol. As another example, a flow may comprise a session in compliance with an iSCSI protocol or a RoCE protocol.

The network switch may maintain an access control list listing allowed and disallowed flows. Detecting the flow 110 may comprise determining if the frame is part of a flow listed in the access control list. For example, detecting a flow 110 may comprise evaluating information elements of the received frame according to various matching criteria. Additionally, detecting a flow corresponding to the frame 110 may comprise detecting with which of a plurality of transport protocols the frame complies. Detecting a flow 110 may be performed in different manners depending on the transport protocol with which the frame comprises.

For iSCSI flows, detecting a flow 110 may comprise detecting a flow 110 based on Ethernet MAC source and destination address, or IP source and destination address. Detecting an iSCSI flow may also include evaluating TCP connection establishment information, session Initiator_Target Nexus information for a plurality of TCP connections associated with an Initiator, or iSCSI control commands.

For RoCE flows, Ethernet frames may be sent from a source to a destination over a single subnet. Various matching criteria, such as Ethernet MAC source and destination address, RoCE layer-3 source and destination address, and Ethertype, may be used to detect a RoCE flow.

For FCoE flows, FC frames, including the FC header and cyclic redundancy check sequence (CRC), may be encapsulated in an FCoE header, which may be in turn carried by a virtual LAN (VLAN) tagged Ethernet frame. For FCoE frames, detecting a flow 110 may comprise inspecting the virtual LAN (VLAN) information element and Ethertype of the encapsulating Ethernet frame. For example, VLAN and Ethertype may be used in implementations where frames are carried from source to destination via the same Ethernet frame with no header rewrites. As another example, FC header information elements such as Destination Address (D_ID), Source Address (S_ID), frame type (R_CTL), protocol type (TYPE), class of service (CS_CTL), and Frame Control (F_CTL) may be used as match criteria to detect a flow. In some example implementations, the network switch and network controller communicate using an OpenFlow protocol. In some such implementations, the OpenFlow protocol may be extended to include these FC header information elements as match fields.

For FC flows, the FC header information elements, such as Destination Address (D_ID), Source Address (S_ID), frame type (R_CTL), protocol type (TYPE), class of service (CS_CTL), and Frame Control (F_CTL) may be used as match criteria to detect a flow. In implementations utilizing OpenFlow, the OpenFlow protocol may be extended to include these FC header information elements as match fields.

For flows complying with other transport protocols, other evaluation criteria may be used to detect a flow 110. Such criteria may be defined by the network administrator according to the CUG or CUGs to be implemented on the switch fabric. For example, such additional evaluation criteria may be provided by a network controller.

The process further includes transmitting, to a network controller, frame information corresponding to the flow 115. In some examples, transmitting the frame information corresponding to the flow 115 comprises transmitting all or a portion of the received frame's header to the network controller. In other examples, the frame information may comprise flow identifiers or other information extracted from the frame for identifying the flow.

In some cases, transmitting the frame information 115 is only performed if the detected flow is a new flow. For example, the frame information is transmitted 115 if the flow is not listed on the network switch's access control list. If the flow is on the access control list, then the switch may not transmit the frame information 115. Instead, the switch may treat the frame according to the flow's entry in the access control list.

The process includes receiving, from the network controller, hard zoning configuration data corresponding to the flow 120. For example, the hard zoning configuration data may indicate whether the flow is between two members of a CUG. The hard zoning configuration data may also include matching criteria to allow the network switch to identify the flow in future frames. For example, the hard zoning configuration data may include a destination address, source address, and protocol type.

The process includes updating an access control list according to the hard zoning configuration data 125. For example, the network switch may add an entry in its access control list including the matching criteria included in the hard zoning configuration data. In some cases, the entries in the access control list may indicate if the flow is disallowed or allowed. If the flow is disallowed, then the network switch may implement hard zoning by discarding the frame. Additionally, future frames of the flow may be evaluated according to the updated access control list. In some examples, the access control list may be implemented using switch hardware resources, such as ternary content addressable memory (TCAM).

In some implementations, the flow may comply with a first networking protocol, and the access control list may include hard zoning configuration data corresponding to a second flow, the second flow complying with a second networking protocol different from the first networking protocol. For example, the switch may use a single access control list to evaluate frames transmitted using multiple transport protocols. For example, RoCE flows and FCoE flows may be included in the same access control list. In such an example, the same hardware resources may be used to implement hard zoning for multiple transport protocols. For example, a single TCAM table may be used to implement an access control list that includes multiple transport protocols.

Figure 2:
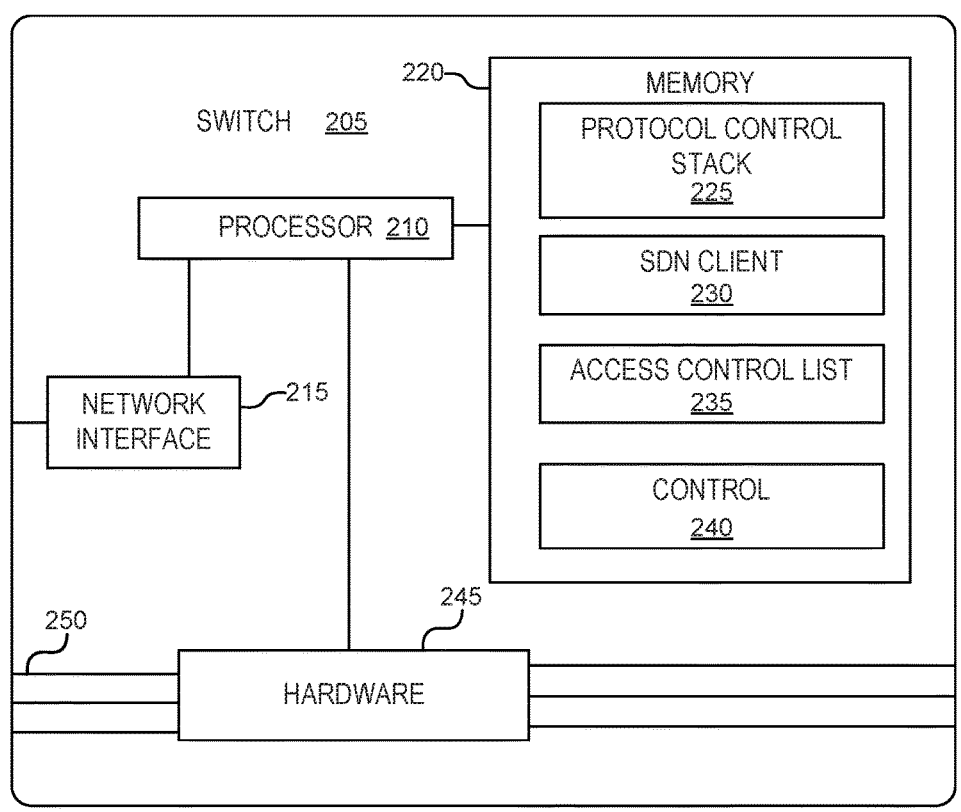
FIG. 2 illustrates an example network switch having an access control list based on hard zoning configuration data provided by a network controller.

FIG. 2 illustrates an example network switch 205. The example network switch 205 may be a switch in a fabric controlled by a network controller to implement hard zoning in a transport independent manner. For example, the switch 205 may perform the process illustrated in FIG. 1. In some implementations, the switch 205 may be one of several edge switches in a three-tier network, a fat tree flat network, a full mesh network, or other data center or SAN network.

The switch 205 includes a processor 210, and a memory 220, a network interface 215, and switch hardware 245 coupled to the processor 210. The processor 210 may be any processing unit capable of executing instructions stored in memory 220, configuring the switch hardware 245, and communicating using the network interface 215.

Memory 220 may be a non-transitory computer readable medium capable of being read and written by the processor 210. In this example, the memory 220 contains computer executable instructions, including a protocol control stack 225, a software defined network (SDN) client 230, an access control list 235, and a control module 240.

The protocol control stack 225 may include instructions allowing the network switch 205 to operate in compliance with a transport protocol. For example, the control stack 225 may be an Ethernet control stack, allowing the switch 205 to operate in compliance with the Ethernet protocol and protocols using the Ethernet protocol, such as RoCE, FCoE, or iSCSI. As another example, the control stack 225 may be a FC control stack. As a further example, the control stack 225 may be a converged network control stack, including instructions to allow the switch 205 to operate in compliance with multiple transport protocols, such as Ethernet and FC.

The SDN client 230 may include instructions to cause the switch 205 to communicate with a network controller to receive configuration data to implement a software defined network. For example, the SDN client 230 may comprise an OpenFlow client, which may include extensions to allow the switch 205 to identify additional flows, such as FC and FCoE flows. The SDN client 230 may cause the processor 210 to communicate with a network controller via the network interface 215. In some implementations, the network interface 215 may connect to the fabric that the switch 205 is a part of. For example, both the switch 205 and the network controller may be nodes of the fabric. In other implementations, the network interface 215 may connect to a separate transport network connecting the switches of the fabric to the network controller.

The access control list 235 may comprise a list reflecting membership in a CUG implemented using the switch. For example, the access control list 235 may comprise a list of allowed flows representing pairwise connections between network nodes that are members of the same CUG. The access control list 235 may be populated using hard zoning configuration data obtained from a network controller via operation of the SDN client 230. The hard zoning configuration data may correspond to flows of various protocols. Accordingly, the access control list 235 may include flows from different protocols.

The control module 240 may include instructions to cause the processor 210 to implement the protocol control stack 225 and the SDN client 230. Additionally, the control module 240 may include instruction to cause the processor 210 to configure the switch hardware 245 to implement the switch's 205 network behaviors. For example, the control module 240 may cause the processor 210 to configure a ternary content addressable memory (TCAM) table of the hardware 245 to reflect the contents of the access control list 235.

The hardware 245 may comprise application specific integrated circuits (ASICS) and TCAM tables, and may be coupled to a plurality of ports 250. The hardware 245 may operate to implement the switch behavior configured by the processor 210 without further processor operation. For example, the hardware 245 may implement the hard zoning behavior reflected in the access control list 235. The hardware 245 may evaluate frames received via a port 250 according to the TCAM table. If the frame is in an allowed flow, the hardware 245 may forward or switch the frame to another port 250. If the access control list 235 includes flows from multiple protocols, then a single TCAM table may be used to implement hard zoning for multiple protocols.

Figure 3:
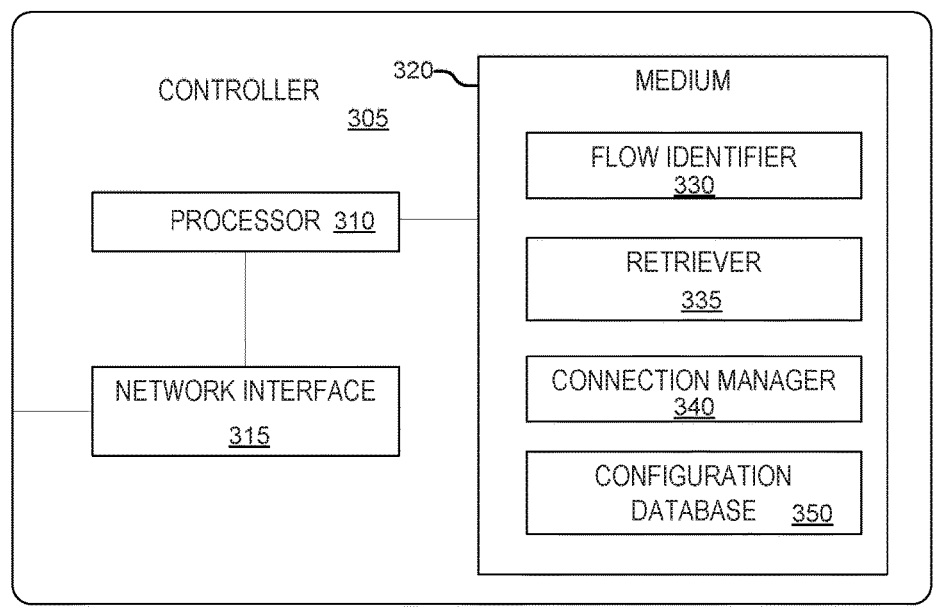
FIG. 3 illustrates an example network controller, including a non-transitory computer readable medium, for transmitting hard zoning configuration data to a network switch.

FIG. 3 illustrates an example network controller 305, including a non-transitory computer readable medium 320, for transmitting hard zoning configuration data to a network switch. For example, the network controller 305 may connect to a network switch as illustrated in FIG. 2.

The example network controller 305 includes a non-transitory computer readable medium having computer executable instructions stored thereon. For example, the non-transitory computer readable medium 320 may comprise read-only memory (ROM), random access memory (RAM), storage, or a combination thereof. In this example, when executed by the processor 310, the instructions implement a flow identifier 330, a retriever 335, and a connection manager 340. In other examples, these modules may be implemented by hardware logic or by a combination of software and hardware logical elements.

The example network controller 305 includes a network interface 315. The network interface 315 may allow the controller to receive frame information from a network switch. The frame information may be information corresponding to a flow. For example, the frame information may be a copy of a frame header or a portion of a frame header. In some implementations, the frame information may be transmitted by a network switch performing the process illustrated in FIG. 1.

The example network controller 305 also includes a flow identifier 330. The flow identifier 330 may use the frame information to identify a flow corresponding to the frame. For example, the flow identifier 330 may use the frame information to determine a source node and a destination node to identify the flow. Additionally, the flow identifier 330 may use the frame information to determine a transport protocol to which the flow complies. The flow identifier 330 may use the transport protocol to identify the flow. Flows identified by the flow identifier 330 may include connections in compliance with an FC or FCoE protocol, or sessions in compliance with an iSCSI or a RoCE protocol.

The example network controller 305 also includes a retriever 335 to retrieve hard zoning configuration data corresponding to the flow. For example, the retriever 335 may retrieve the hard zoning configuration data from a configuration database 350. The configuration database 350 may include a table of allowed pairwise flows forming a closed user group. If the configuration database 350 includes the flow identified by the flow identifier 330, then the hard zoning configuration data may indicate that the flow is an allowed flow. If the configuration database 350 does not include the flow, then the controller 305 may generate hard zoning configuration data indicated that the flow is a disallowed flow. In the illustrated example, the configuration database 350 is stored on medium 320. For example, the configuration database 350 may be provided to the controller 305 by a network administrator via the network interface 315. In other examples, the configuration database may be stored at an external location, and the controller 305 may query the configuration database via the network interface 315.

The example network controller 305 also includes a connection manager 340. The connection manager 340 may cause the network controller 305 to transmit the hard zoning configuration data to a network switch. For example, the connection manager 340 may cause the network controller 305 to transmit the hard zoning configuration data to the network switch via the network interface 315. In some implementations, the connection manager 340 may include an SDN protocol stack, such as an OpenFlow protocol stack. If the flows identified by the flow identifier 330 include FC or FCoE flows, the OpenFlow protocol stack may be extended to include FC or FCoE flows. Accordingly, the connection manager 340 may cause the network interface 315 to transmit the hard zoning configuration data in compliance with an OpenFlow protocol extended to include FC or FCoE flows. The network switch may be an ingress edge switch or an egress edge switch. In some cases, the connection manager 340 may cause the controller 305 to transmit to an ingress edge switch and an egress edge switch. For example, the ingress edge switch and the egress edge switch may be the switches corresponding to the flow source and destination, respectively.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A method of a network switch, comprising:
   receiving a frame;
   detecting a first flow corresponding to the frame, the first flow complying with a first networking protocol;
   transmitting, to a network controller, frame information corresponding to the first flow;
   receiving, from the network controller, hard zoning configuration data corresponding to the first flow; and
   updating an access control list according to the hard zoning configuration data, the access control list including information of hard zoning configuration data corresponding to a second flow, the second flow complying with a second networking protocol different from the first networking protocol, and the second networking protocol lacking a hard zoning scheme, wherein the information of the hard zoning configuration data corresponding to the second flow and included in the access control list comprises information identifying the second networking protocol.

2. The method of claim 1, wherein detecting the first flow corresponding to the frame comprises detecting with which of a plurality of transport protocols the frame complies.

3. The method of claim 1, wherein the access control list is implemented using a single ternary content-addressable memory table.

4. The method of claim 1, further comprising:
detecting, by the network switch, a third flow corresponding to another frame, the third flow complying with the second networking protocol that lacks a hard zoning scheme;
transmitting, by the network switch to the network controller, frame information corresponding to the third flow;
receiving, by the network switch from the network controller, further hard zoning configuration data corresponding to the third flow; and
updating, by the network switch, the access control list according to the further hard zoning configuration data.

5. The method of claim 4, wherein the first networking protocol is a connection-based protocol, and the second networking protocol is a session-based protocol.

6. The method of claim 4, wherein the second networking protocol is a Remote Direct Memory Access over Converged Ethernet (RoCE) protocol or an Internet Small Computer System Interface (iSCSI) protocol.

7. The method of claim 4, wherein the updating of the access control list according to the hard zoning configuration data corresponding to the first flow comprises adding information identifying the first networking protocol to the access control list.

8. A network controller, comprising:
a network interface to receive, from a network switch, frame information corresponding to a flow that complies with a session-based transport protocol;
a processor to;
use the frame information to determine the session-based transport protocol and a source node and a destination node to identify the flow, and
retrieve hard zoning configuration data corresponding to the flow; and
the network interface to transmit, to the network switch, the hard zoning configuration data.

9. The network controller of claim 8, wherein the processor is to retrieve the hard zoning configuration data from a configuration database comprising a table of allowed pairwise flows, the allowed pairwise flows forming a closed user group.

10. The network controller of claim 8, wherein the network switch comprises an ingress edge switch, and wherein the network interface is to transmit the hard zoning configuration data to an egress edge switch corresponding to the flow.

11. The network controller of claim 8, wherein the flow comprises:
a session in compliance with an Internet Small Computer System Interface protocol or a Remote Direct Memory Access over Converged Ethernet protocol.

12. The network controller of claim 8, wherein the network interface is to transmit the hard zoning configuration data in compliance with an OpenFlow protocol extended to include Fibre Channel or Fibre Channel over Ethernet flows.

13. The network controller of claim 8, wherein the network interface is to receive, from the network switch, further frame information corresponding to a further flow that complies with a connection-based transport protocol, and the processor is to:
use the further frame information to determine the connection-based transport protocol and a source node and a destination node to identify the further flow, and
retrieve further hard zoning configuration data corresponding to the further flow,
wherein the network interface is to transmit, to the network switch, the further hard zoning configuration data.

14. A non-transitory computer readable medium having computer executable instructions stored thereon, the instructions when executed cause a system to:
use information from a frame to identify a flow corresponding to the frame, and to identify a transport protocol that lacks a hard zoning scheme, the flow complying with the transport protocol;
retrieve hard zoning configuration data corresponding to the flow; and
cause a network controller to transmit the hard zoning configuration data to a network switch.

15. The non-transitory computer readable medium of claim 14, wherein the instructions when executed cause the system to:
use the information from the frame to identify a flow source address;
use the information from the frame to identify a flow destination address; and
use the flow source address, the flow destination address, and the transport protocol to identify the flow.

16. The non-transitory computer readable medium of claim 14, wherein the instructions when executed cause the system to cause the network controller to transmit the hard zoning configuration data to a second network switch.

17. The non-transitory computer readable medium of claim 14, wherein the instructions when executed cause the system to retrieve the hard zoning configuration data from a configuration database.

18. The non-transitory computer readable medium of claim 17, wherein the configuration database comprises a table of pairwise flows forming a closed user group.

19. The non-transitory computer readable medium of claim 14, wherein the instructions when executed cause the system to:
use information from a further frame to identify a further flow corresponding to the further frame, and to identify a further transport protocol that has a hard zoning scheme, the further flow complying with the further transport protocol;
retrieve further hard zoning configuration data corresponding to the further flow; and
cause the network controller to transmit the further hard zoning configuration data to the network switch.

* * * * *